US010816144B2

(12) United States Patent
Ludwig et al.

(10) Patent No.: US 10,816,144 B2
(45) Date of Patent: Oct. 27, 2020

(54) LIGHT BULB BASE CONNECTOR (71) Applicant: ITC Incorporated, Hudsonville, MI (US)

(72) Inventors: Gary R. Ludwig, Hudsonville, MI (US); Qingqi Xu, Huizhou (CN)

(73) Assignee: ITC Incorporated, Hudsonville, MI (US)

(*) Notice: Subject to any disclaimer, the term of this patent is extended or adjusted under 35 U.S.C. 154(b) by 0 days.

(21) Appl. No.: 16/592,712

(22) Filed: Oct. 3, 2019

(65) Prior Publication Data
US 2020/0109824 A1 Apr. 9, 2020

Related U.S. Application Data (60) Provisional application No. 62/740,626, filed on Oct. 3, 2018.

(51) Int. Cl.
F21K 9/235 (2016.01)
F21V 29/508 (2015.01)
F21K 9/238 (2016.01)
F21K 9/237 (2016.01)
F21K 9/232 (2016.01)
F21V 23/06 (2006.01)
F21S 8/00 (2006.01)

(52) U.S. Cl.
CPC ............ F21K 9/235 (2016.08); F21K 9/232 (2016.08); F21K 9/237 (2016.08); F21K 9/238 (2016.08); F21S 8/036 (2013.01); F21V 23/06 (2013.01); F21V 29/508 (2015.01)

(58) Field of Classification Search
CPC .......... F21K 9/235; F21K 9/237; F21K 9/238; F21V 19/0035; F21V 19/0055; F21V 21/116
See application file for complete search history.

(56) References Cited

U.S. PATENT DOCUMENTS

| | | | | |
|---|---|---|---|---|
| 2009/0079356 A1* | 3/2009 | Yang | ................. | F21V 19/00 315/276 |
| 2010/0277068 A1* | 11/2010 | Broitzman | .............. | F21V 23/06 315/32 |
| 2012/0243241 A1* | 9/2012 | Hsieh | ..................... | F21V 1/146 362/373 |
| 2016/0198553 A1* | 7/2016 | Fathollahi | .............. | H05B 47/19 315/291 |
| 2018/0035518 A1* | 2/2018 | Cook | .................. | H04L 12/2816 |

* cited by examiner

Primary Examiner — William N Harris
(74) Attorney, Agent, or Firm — Varnum, Riddering, Schmidt & Howlett LLP (57) ABSTRACT A light fixture having a bulb base connector limited to a DC supply with 10-30 volt DC power. The connector assembly utilizes threading, friction and/or detent connection for connecting a lightbulb assembly to the light fixture in vehicles. A dual threading system and a barrel connector are configured to connect the lightbulb to the light fixture and to supply power from the fixture to the light bulb. The system uses a unique bulb base and connector to adapt to preexisting fixtures.

9 Claims, 10 Drawing Sheets

LIGHT BULB BASE CONNECTOR

CROSS-REFERENCE TO RELATED APPLICATION

This application claims priority to U.S. Provisional Patent Application No. 62/740,626 filed on Oct. 3, 2018 and entitled LIGHT BULB BASE CONNECTOR, which is hereby incorporated by reference.

TECHNICAL FIELD

The present specification generally relates to a light bulb base connector and, more specifically, a light bulb base connector with a DC supply with 10-30 volt DC power.

BACKGROUND

Light fixtures in recreational vehicles are particularly useful in applications where space is limited and easy access to the components of the fixture is desired, as within the interior of a recreational or other vehicle. Traditional light bulbs frequently do not have a secure connection between the bulb and the base of the fixture often resulting in rattling, vibration, noise or even disconnection. To remedy this unsecure connection, the components of the light fixture are permanently or semi-permanently attached to each other to prevent rattling, vibration, noise or even disconnection between the light and the fixture, making assembly/disassembly difficult or even impossible.

Accordingly, a need exists for alternative light bulb base connector assembly for vehicles that is both lightweight and provides a secure connection between the bulb and the fixture, while still allowing the end user to easily replace the light bulb. There also exists the need to incorporate a unique base to avoid voltage mixing of bulbs between AC and DC power, particularly between a DC bulb being used in an AC power application.

SUMMARY

A light fixture assembly is generally presented. The light fixture assembly includes a lightbulb assembly comprising an outer housing having a base portion. The outer housing includes a protruded connection portion extending away from the base portion. The protruded connection portion includes a threaded circumference. The outer housing further includes an opening aligned with the protruded connection portion. A first electrical connection component is positioned adjacent to the opening in the outer housing. A light circuit board is positioned adjacent to the first electrical connection component, the light circuit board includes one or more light sources disposed about the circuit board. The threaded circumference of the protruded connection portion is configured to engage a first threaded portion of an interconnecting component. The interconnecting component further includes second threaded portion to connect the lightbulb assembly to a fixture.

In an embodiment, the light fixture assembly includes a second electrical connection component configured to connect to the first electrical connection component. The first and second electrical connection components may comprise a male and female barrel connector. The male barrel connector may be disposed within an opening in the interconnecting component.

The light sources disposed on the light circuit board may comprise LED lights. One or more heat sinks may be disposed adjacent to the light circuit board, such as near each LED light.

The interconnecting component may include two or more central bores extending therethrough, and wherein the two or more bores have different diameters. The interconnecting component may be connected to a fixture by a locking nut. The opening in the housing that is aligned with the first electrical connection component may be positioned central to the protruded connection portion.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
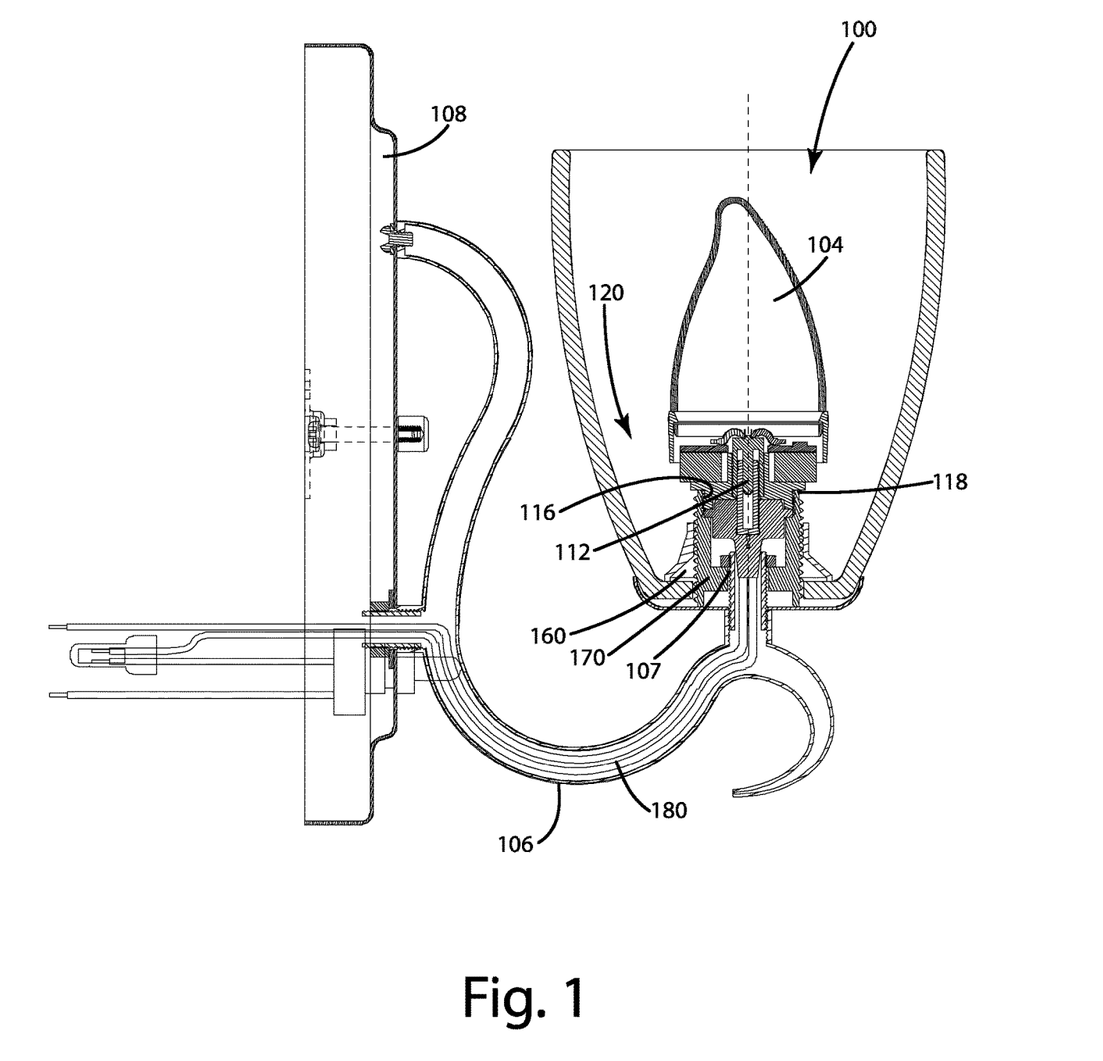
FIG. 1 depicts a partial cross sectional side view of the light fixture, bulb and connection between the fixture and the bulb according to one or more embodiments shown and described herein.

FIG. 1 generally depicts a light fixture having a bulb base connector limited to a DC supply with 10-30 volt DC power. The connector uses threading, friction and/or detent connection for connecting the bulb to the light fixture in vehicles. The present light fixture is most commonly used in recreational vehicles but may also be used in marine or other situations requiring a DC supply and 10-30 volt DC power. A dual threading system and a barrel connector are configured to connect the lightbulb to the light fixture and to supply power from the fixture to the light bulb. The system uses a unique bulb base and an over-molded connector to adapt to preexisting fixture sockets. The accompanying drawings and below disclosure discuss the present and various other embodiments of the present specification.

Referring now to FIG. 1, the light fixture 100 includes a shade 104 and a bulb assembly 120. In the present embodiment, the shade 104 may be glass or plastic/plastic like configured to imitate the appearance of glass. The shade 104 may be colored, transparent, frosted, translucent or a combination thereof based on the desired characteristics of the end user. The lightbulb assembly 120 is supplied by only 10-30 volt DC power, such as 12 volt DC power, via a DC supply.

The light bulb assembly 120 may utilize LED, halogen, or incandescent lights and may include a glass or plastic/polymer bulb lens material to protect the actual light supply source. The light shade 104 may be various shapes to mimic the look of a traditional lightbulb.

Figure 2:
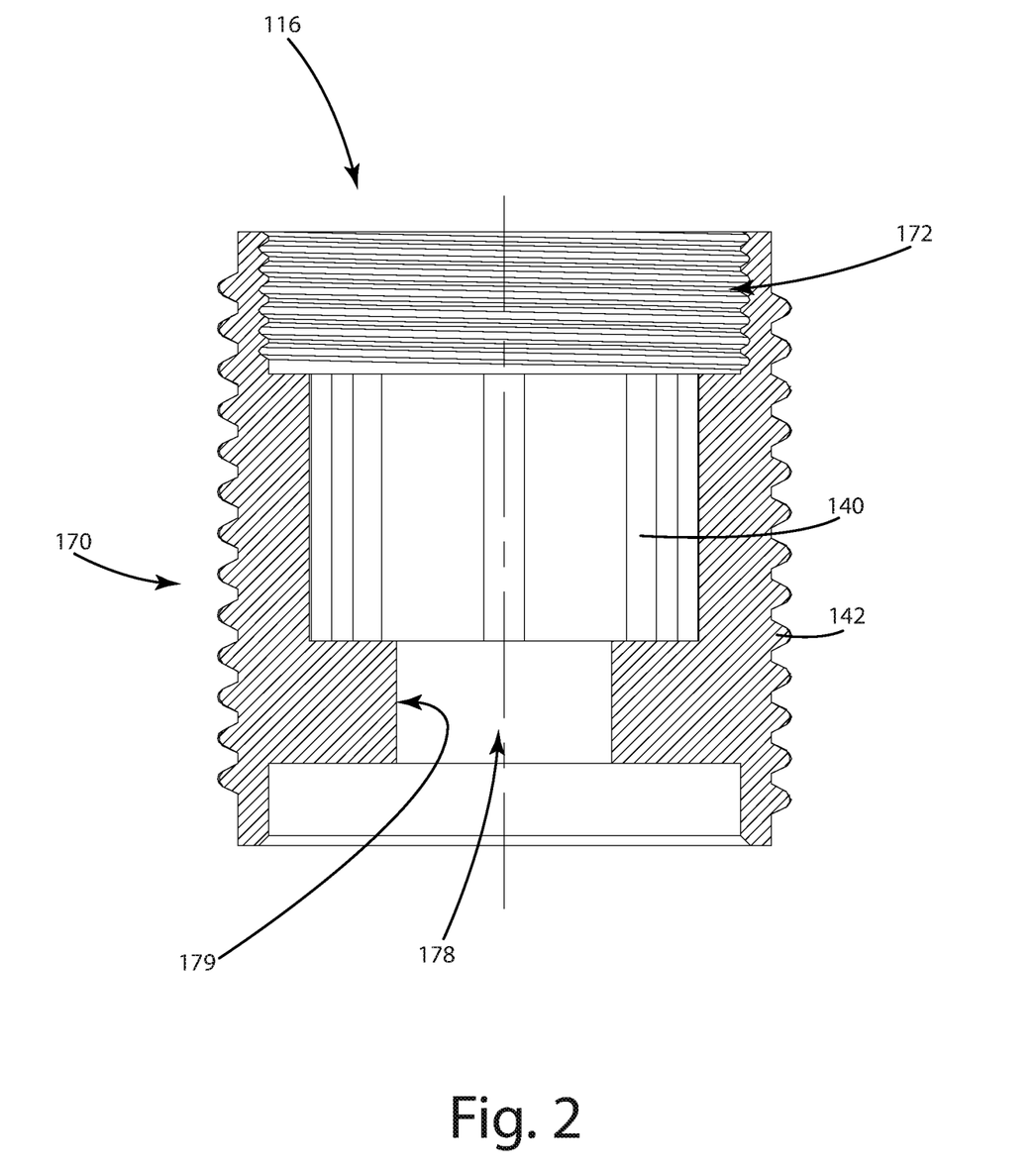
FIG. 2 depicts a cross-sectional side view of the cylindrical connector configured to interconnect other components to the fixture according to one or more embodiments shown and described herein.
Figure 3:
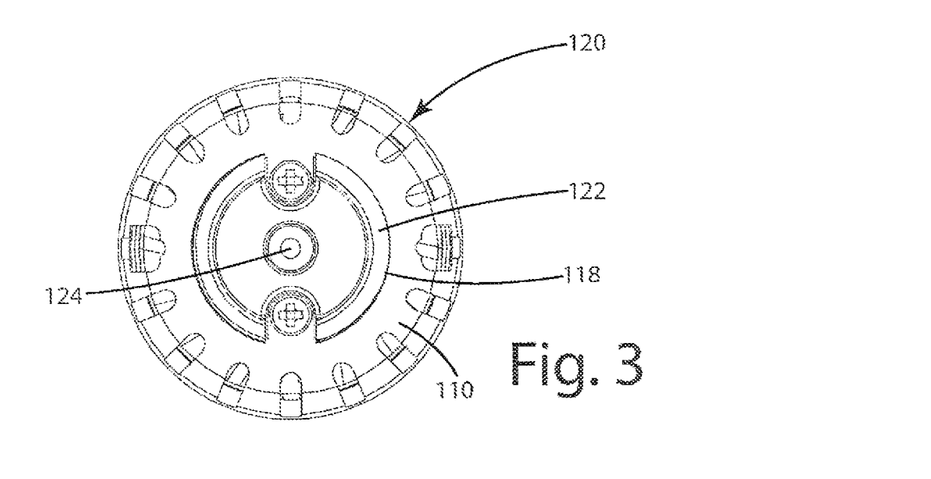
FIG. 3 depicts a bottom view of the lightbulb assembly having the bulb base connector with screw portions and the bulb which all connect to the fixture according to one or more embodiments shown and described herein.
Figure 4:
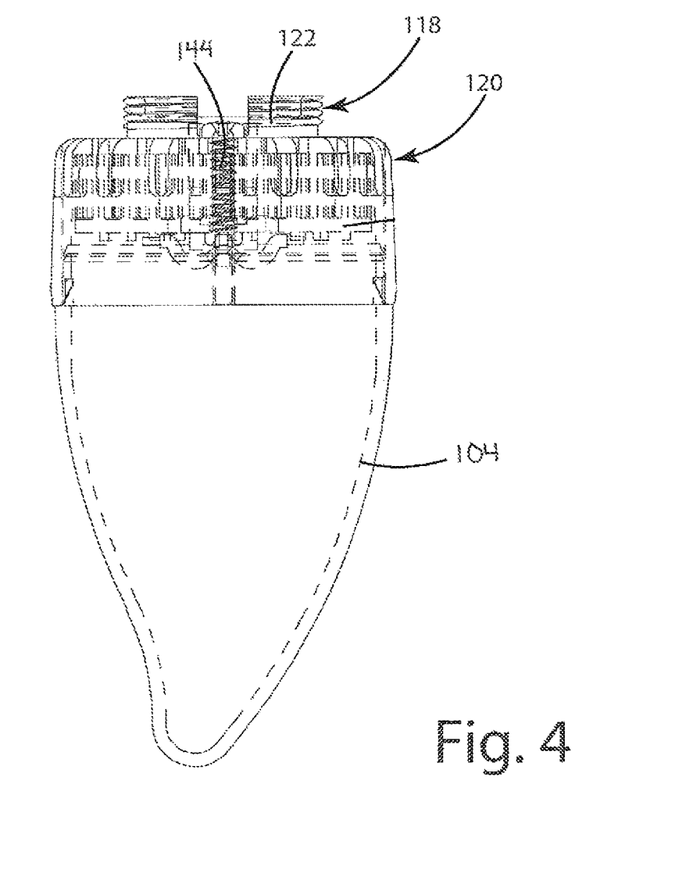
FIG. 4 depicts a side view of the lightbulb assembly having the lightbulb base connector with screw portions and the bulb which all connect to the fixture according to one or more embodiments shown and described herein.

The light bulb assembly 120 generally includes an outer housing 110 configured to surround and contain the components of the light bulb assembly 120. The outer housing 110 includes a protruded connection portion 122, extending away from a bottom surface of the housing 110. The protruded connection portion 122 has a generally circular shape and a threaded outer circumference. The threaded portion, as indicated at reference numeral 118, is configured to connect to an internal threaded portion 116 of a connector 170 (such as illustrated in FIG. 2). The connector 170 (or interconnector) is configured to interconnect the light bulb assembly 120 with a given light connection. To accomplish the interconnection, the connector 170 includes exterior threads 142 about its outer circumference and inner threads 116 covering an inner circumference of an upper portion 172 of the connector 170. The threads 116, as shown in FIG. 2, are configured to connect directly to the threads 118, as shown in FIGS. 3 and 4, of the lightbulb assembly 120. The connector 170 is configured to interconnect the unique light bulb assembly 120 to fit with preexisting fixture sockets.

Further referring to FIG. 1, a locking nut 160 is provided to secure the connector 170 to the fixture 100. The locking nut 160 may include a tapered portion on the exterior and an inner threaded portion. The inner threaded portion is configured to connect to the threads 142 of the connector 170. The connector 170 is generally cylindrical in shape having both interior and exterior threading and a central bore 178 there through. A barrel connector 112 generally transfer power to the lightbulb assembly 120. In this exemplary embodiment, the light fixture 100 shown includes a face mounting plate 108 to cover the various electrical components which are required to connect to the vehicle wall. The light fixture 100 further includes an arm 106 which is hollow to encase the wires 180 which are required to transfer power to the lightbulb 104. The fixture 100 is configured to connect to DC supply with 10-30 volt DC power as supplied by a recreational, or otherwise, vehicle. The light fixture 100 is configured to be hard-wired into the wall and operated by a traditional power switch.

The locking nut 160 is provided as an exemplary embodiment to illustrate the environment of the fixture. It will be appreciated that any locking or connecting device may be employed to secure the connection between the connector 170 and the fixture.

FIG. 2 depicts a cross-sectional view of the cylindrical connector 170. The cylindrical connector 170 includes a center bore 178 having various internal diameters and includes threading 179. The upper portion 172 of the cylindrical connector 170 includes the threads 116. The threads 116 are configured to connect to the threads 118 of the lightbulb assembly 120. The upper portion 172 of the cylindrical connector 170 includes said threads 116 which are configured to connect to the threads 118 of the lightbulb assembly 120. The cylindrical connector 170 further includes open space 140 which is configured to accommodate the housing portion of the barrel connector 112, as described in further detail below.

Figure 7:
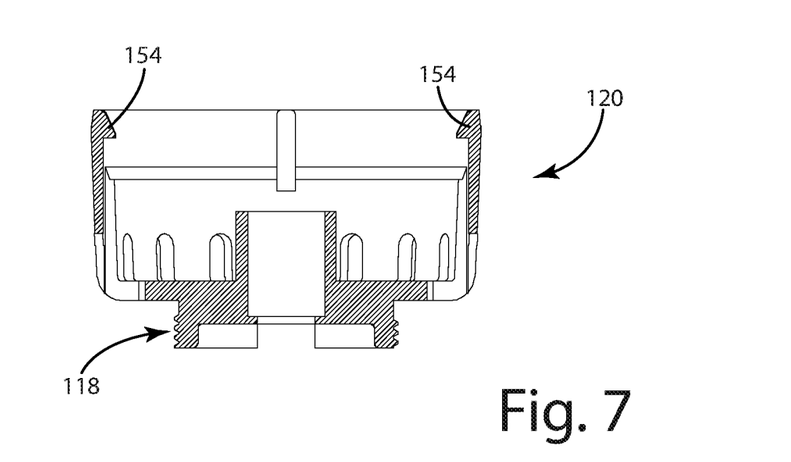
FIG. 7 depicts a side view of the bulb base connector including the prongs for connection to both the bulb and the fixture according to one or more embodiments shown and described herein.
Figure 8:
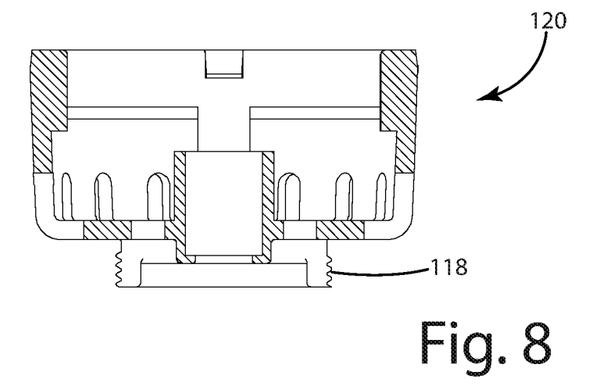
FIG. 8 depicts an alternative side view of the bulb base connector including the prongs for connection to both the bulb and the fixture according to one or more embodiments shown and described herein.
Figure 9:
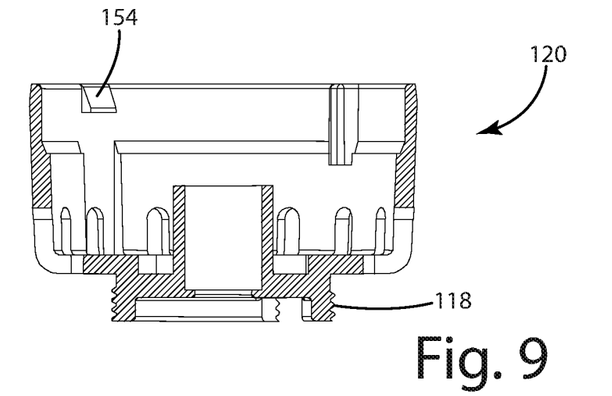
FIG. 9 depicts yet another an alternative side view of the bulb base connector including the prongs for connection to both the bulb and the fixture according to one or more embodiments shown and described herein.
Figure 10:
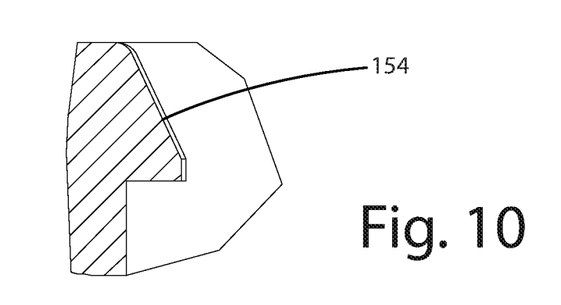
FIG. 10 depicts a prong used in connection with the bulb base connector including the prongs for connection to both the bulb and the fixture according to one or more embodiments shown and described herein.
Figure 11:
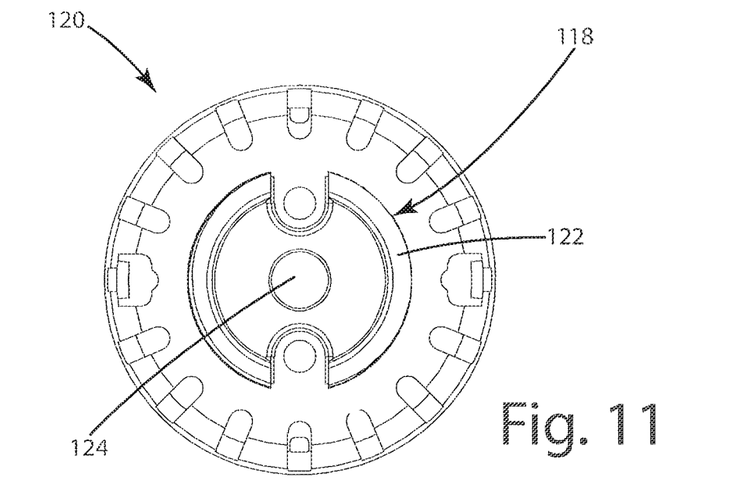
FIG. 11 depicts a bottom view of the bulb base connector including the prongs for connection to both the bulb and the fixture according to one or more embodiments shown and described herein.
Figure 12:
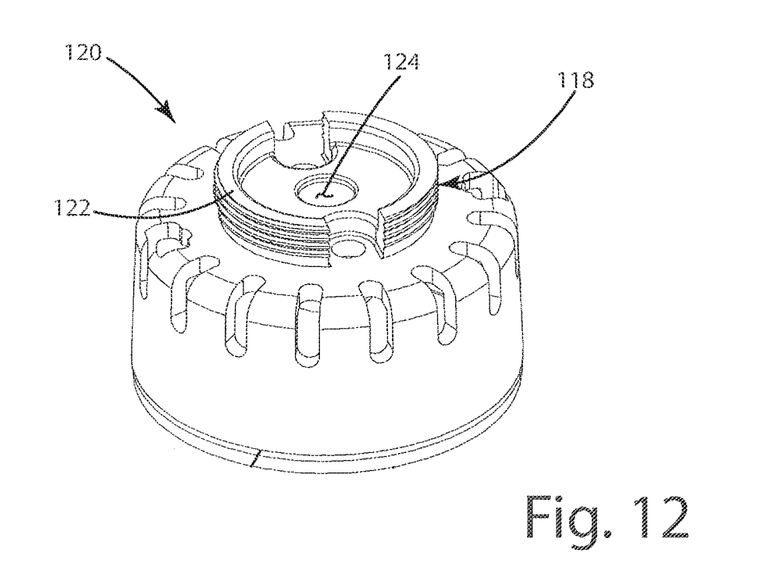
FIG. 12 depicts a perspective bottom view of the bulb base connector including the prongs for connection to both the bulb and the fixture according to one or more embodiments shown and described herein.

FIGS. 3 through 11 depict the light bulb assembly 120 and all of the various components for interconnecting the shade 104 and the internal light components. The shade 104 may be made of a glass, plastic, polymer, plastic like and/or polymer like material. The material of the shade 104 may be frosted or otherwise translucent to give the light emitted a softer appearance. The shape of the shade 104 may also be configured to mimic a chandelier bulb, a traditional bulb, LED filament bulb or even a candle flame. The light source within the shade 104 may be an LED, halogen or traditional incandescent light source. The shade 104 is directly connected to the lightbulb assembly 120. For example, as illustrated in the figures, the lightbulb assembly 120 may connect to the shade 104 by a plurality of protrusions or prongs 154. The prongs 154, such as illustrated in FIGS. 7 and 10, are configured to connect directly to an indentation or opening 152 on the shade 104.

Figures 13, 14:
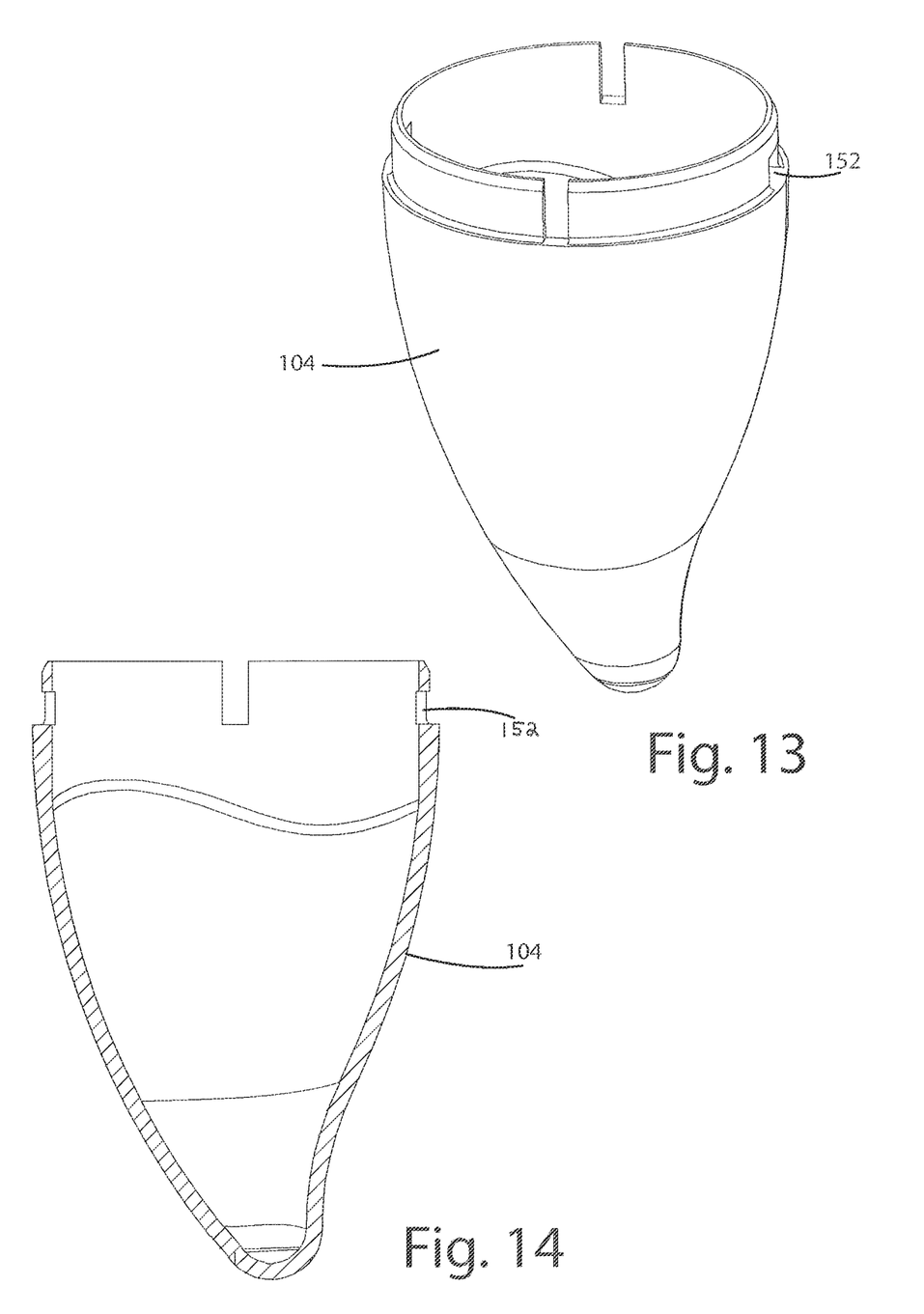
FIG. 13 depicts perspective view of a light bulb lens used in connection with the bulb base connector for connection to both the bulb and the fixture according to one or more embodiments shown and described herein.
FIG. 14 depicts side view of a light bulb lens used in connection with the bulb base connector for connection to both the bulb and the fixture according to one or more embodiments shown and described herein.
Figure 15:
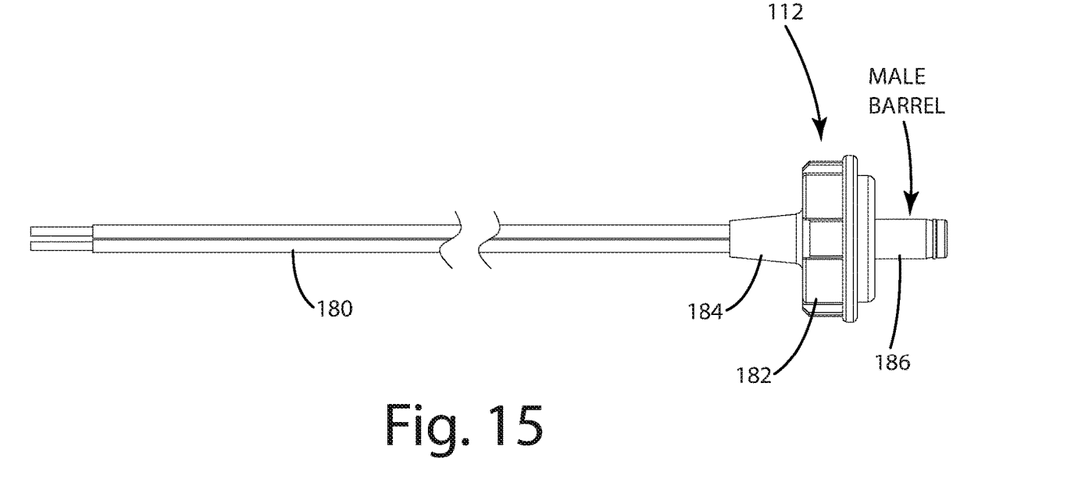
FIG. 15 depicts the barrel connector and corresponding wiring use to connect the light bulb to the power source of the light fixture according to one or more embodiments shown and described herein.
Figure 16:
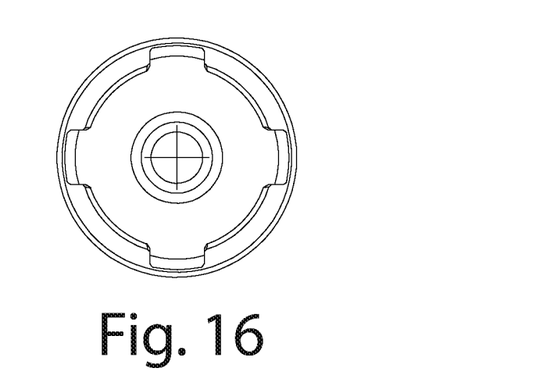
FIG. 16 depicts a top view of the barrel use to connect the light bulb to the power source of the light fixture according to one or more embodiments shown and described herein.
Figure 17:
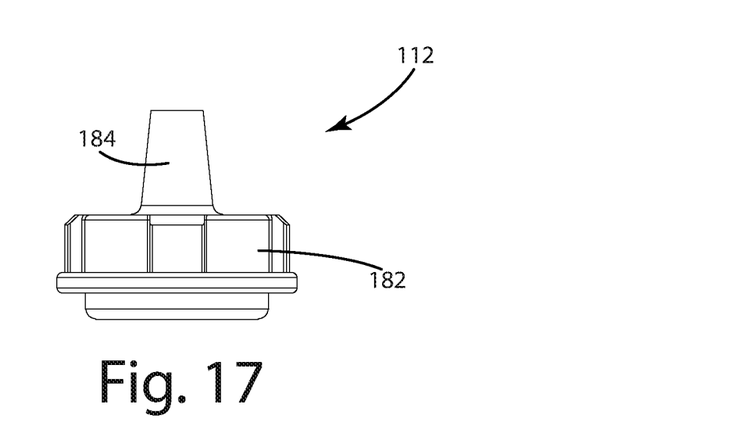
FIG. 17 depicts a side view of the barrel use to connect the light bulb to the power source of the light fixture according to one or more embodiments shown and described herein.
Figure 18:
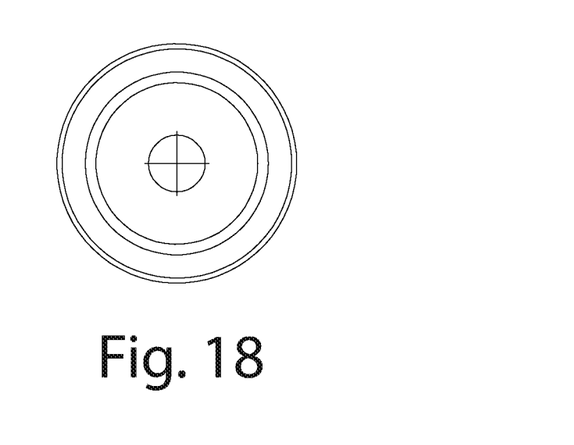
FIG. 18 depicts a bottom view of the barrel use to connect the light bulb to the power source of the light fixture according to one or more embodiments shown and described herein.

As illustrated in FIG. 13, an indentation 152 is disclosed on the lower portion of the shade 104. The indentation 152 includes the same or similar geometry to securely connect the prongs 154 to the shade 104. During installation, the prongs 154 connect to the indentation 152 in a snap fit connection so as to securely connect the shade 104 to the bulb lightbulb assembly 120. The lightbulb assembly 120 further includes the protruded connection portion 122. The protruded connection 122 is generally circular and includes an outer circumference including the threading 118. The connector 122 protrudes away from the lightbulb assembly 120 at a generally perpendicular angle to a base portion of the outer housing 110, and has a circumference that is less than the circumference of the outer housing 110. The protruded connection 122 is generally circular in shape with various cut out portions as necessary for additional screw connections. The threaded portion 118 on the protruded connection 122 is configured to connect directly to the cylindrical connector 170 at the upper portion 172 to the threads 116. This connection provides a secure and tight fit of the bulb to the overall fixture 100.

In the present embodiment, the threaded connection between the threads 116, 118 provide a secure connection of the bulb 104 to the fixture 100. In other embodiments, the connector portion 122 of the lightbulb assembly 120 is configured to cross fit into the upper portion 172 of the cylindrical connector 170. The cross fit connection provides a secure connection, but still allows the end user to swap out or replace the shade 104 as necessary. In other further embodiments, detents, protrusions, indentations and/or ridges may be used to facilitate the connection between the connection portion 122 of lightbulb assembly 120 and the cylindrical connector 170.

FIGS. 15 through 18 depict the barrel connector portion and corresponding wire mechanisms configured to supply DC 10-30 volt DC power to the lightbulb assembly 120. The barrel connector base assembly 112 includes a plurality of wires 180 configured to extend through the arm 106 which connects directly to the wall of the vehicle through the base plate 108. The wires are configured to supply 10-30 volt DC power, such as 12 volt DC power, to the lightbulb assembly 120. The barrel connector 112 includes a base portion 182 and a connector 184. The connector 184 is configured to fit within an upper opening of the arm 106. The upper opening 107 of the arm 106 connects to the connector 184 in a cross fit connection to secure the barrel connector portion 112 and corresponding housing 182 to the fixture 100 in a secure manner. The barrel connector 112 further includes a male barrel portion 186. The male barrel 186 is configured to connect directly to the lightbulb assembly 120 and insert through the outer housing 110. For example, the male barrel 186 may extend through the aperture 124 of the outer housing 110. The male barrel 186 extends through the aperture 124 to connect directly to the lightbulb assembly 120 so as to supply power to light source.

Figure 5:
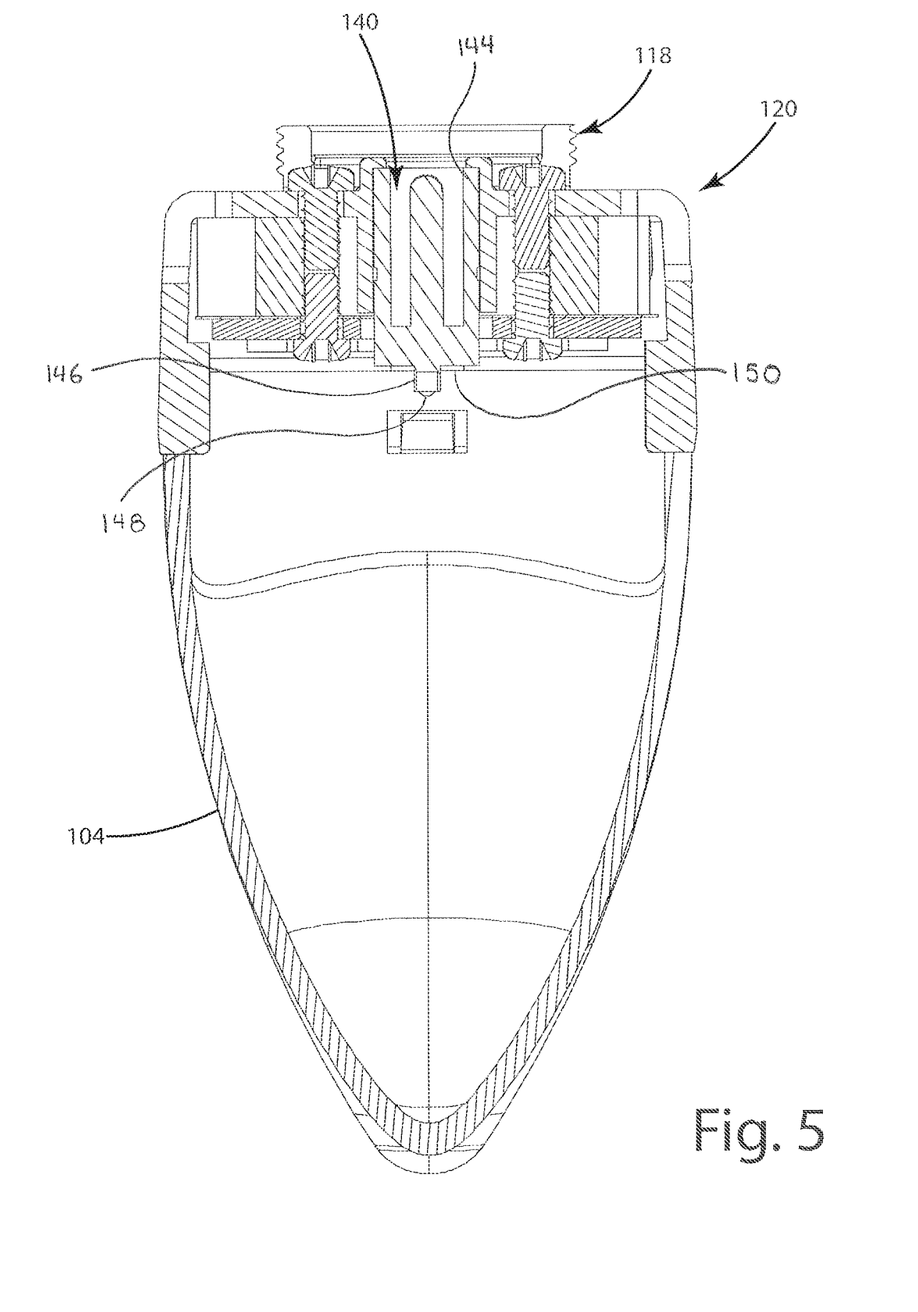
FIG. 5 depicts a side view of the bulb assembly having the bulb base connector with screw portions and the bulb which all connect to the fixture according to one or more embodiments shown and described herein.
Figure 6:
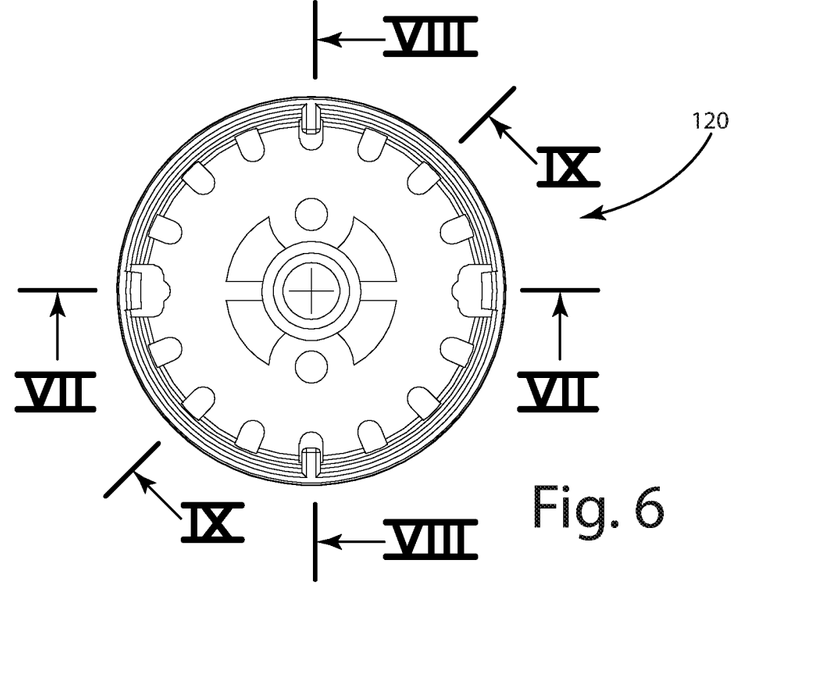
FIG. 6 depicts a top view of the bulb base connector including the prongs for connection to both the bulb and the fixture according to one or more embodiments shown and described herein.

The lightbulb assembly 120 may include components configured to receive the male barrel 186 and power a light source connection. For example, as illustrated in FIG. 5, the lightbulb assembly 120 includes a female barrel connector 144 positioned adjacent to the protrude connection portion 122, such as centrally located on a base portion of the outer housing 110. The female barrel connector 144 may be configured to receive the fixed male barrel connector 186 when the lightbulb assembly 120 is seated within the upper portion 172 of the cylindrical connector 170. While the fixture 100 is shown and illustrated as having a male and female barrel connectors 186, 144, it will be appreciated that any appropriate electrical connection may be utilized to create an electrical connection between the fixture and the lightbulb assembly 120.

The lightbulb assembly 120 may further include an LED light circuit board 146 in electrical connection with the female barrel connector 144. The LED light circuit board 146 may receive the DC voltage signal from the female barrel connector 186 and may be configured to power one or more LED lights 148. LED light circuit board 146 may be circular and disposed about the female barrel connector 144. The plurality of LEDs or light components may be disposed about a top side of the circuit board 146. One or more heat sinks 150 may be disposed adjacent to the LED light circuit board 146, such as beneath the circuit board 146 near each LED 148.

The lightbulb assembly 120, the cylindrical connector 170, the barrel connector 112, and the locking nut 160 may all be generally made of a plastic, plastic like, polymer, and/or polymer like material so as to prevent the unwanted transfer of electricity and to lighten the overall weight of the fixture 100. A lower weight of the light fixture 100 is desirable since light fixture 100 is intended for use within a vehicle, specifically a recreational vehicle. Other components, such as the various electrical transfer components may be made of a metal having suitable electricity transfer properties.

The fixture 100 of the present specification is particularly advantageous in that it provides for a unique and secure connection between the lightbulb assembly 120 and the fixture itself 100. The secure connection is desirable in that the fixture will commonly be used within a vehicle where high vibration and movement is common. The secure connection between the bulb and the fixture 100 is important so as to not lose the connection within the barrel connector which may result in a loss of power transfer between the fixture 100 to the bulb 104. The strong connection and unique connection between the bulb and the fixture 100 facilitates the strong connection and improved connection so as loss of power transfer to the bulb become less frequent.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A light fixture assembly comprising:
a lightbulb assembly comprising:
an outer housing comprising a base portion;
a protruded connection portion extending away from the base portion, wherein the protruded connection portion includes a threaded circumference;
an opening in the outer housing aligned with the protruded connection portion;
a first electrical connection component positioned adjacent to the opening in the outer housing; and
a light circuit board positioned adjacent to the first electrical connection component, wherein the light circuit board includes one or more light sources disposed about the circuit board; and wherein the threaded circumference of the protruded connection portion is configured to engage a first threaded portion of an interconnecting component, wherein the interconnecting component further includes a second threaded portion to connect the lightbulb assembly to a fixture;

wherein the interconnecting component includes a second electrical connection component disposed therein, wherein the second electrical connection component is configured to connect to the first electrical connection component;

wherein the first and second electrical connection components comprise a male and female barrel connector.

2. The light fixture assembly of claim 1, wherein the male barrel connector is disposed within an opening in the interconnecting component.

3. The light fixture assembly of claim 1, wherein the one or more light sources comprise one or more LEDs.

4. The light fixture assembly of claim 1, further comprising a locking nut, wherein the locking nut is connected to the second threaded portion of the interconnecting component.

5. The light fixture assembly of claim 1 further comprising one or more heat sinks disposed adjacent to the light circuit board.

6. The light fixture assembly of claim 1, wherein the interconnecting component includes two or more central bores extending therethrough, and wherein the two or more bores have different diameters.

7. The light fixture assembly of claim 1, wherein the opening in the outer housing is positioned at a center of the protruded connection portion.

8. The light fixture assembly of claim 1 further comprising a shade connected to the lightbulb assembly.

9. The light fixture assembly of claim 1, wherein the first electrical connection component is configured to receive a DC voltage connection between 10 and 30 volts DC.

* * * * *